United States Patent Office 3,071,592
Patented Jan. 1, 1963

3,071,592
N,N'-THIODIMALEIMIDE AND N,N'-DITHIODIMALEIMIDE
Elbert C. Ladd, Passaic, N.J., assignor to United States Rubber Company, New York, N.Y., a corporation of New Jersey
No Drawing. Filed July 7, 1961, Ser. No. 122,415
3 Claims. (Cl. 260—326.3)

This invention relates to a new class of chemicals, denoted N,N'-thiodimaleimide and N,N'dithiodimaleimide, and represented by the formula:

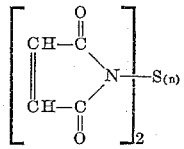

wherein $n$ represents in the case of N,N'-thiodimaleimide the integer 1, and in the case of N,N'-dithiodimaleimide $n$ represents the integer 2. The chemicals are suitably prepared by reacting sodium maleimide with sulfur dichloride in the case of N,N'-thiodimaleimide, and with sulfur monochloride in the case of N,N'-dithiodimaleimide.

The object of this invention is to provide a new class of chemicals, namely, N,N'-thiodimaleimide and N,N'-dithiodimaleimide, having particular utility as rubber vulcanizing agents. Other objects will appear from the description of this invention which follows.

These reactions for the preparation of the chemicals of this invention may be represented as follows:

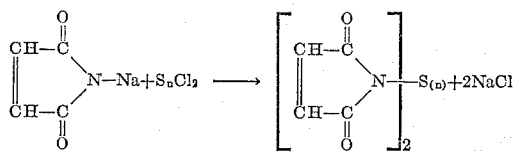

wherein $n$ represents one of the intergers 1 and 2. The reactions are preferably conducted in the presence of a solvent. Recovery and purification of the desired products can then be effected by filtration, washing and recrystallization.

The compounds of this invention are particularly useful as vulcanizing agents for rubbers. They may also be copolymerized with a variety of ethylenically unsaturated monomers such as styrene, acrylates, methacrylates and the like to yield cross linked polymers.

The following examples disclose the invention in more detail.

EXAMPLE 1

Preparation of N,N'-Thiodimaleimide 23.8 grams of sodium maleimide were added slowly with stirring to 10.3 grams of sulfur dichloride contained in 200 milliliters of tetrahydrofuran. A mildly exothermic reaction resulted and caused the temperature to rise about 30° C. After the reaction was complete, stirring of the mixture was continued for a few minutes. The precipitate which had formed was then separated by filtration, washed with tetrahydrofuran, and air dried. The dry precipitate weighing 28 grams was then extracted with water and recrystallized from acetic acid to yield a final gray solid product which when dry weighed 14 grams. No definite melting point for this product was obtained, however, tests indicated that this product formed a temporary melt when dropped on a 300° C. hot plate. Since no definite melting point was obtained, infra red and nuclear magnetic resonance spectroscopy were used to more definitively determine the structure of the compound.

Chemical analysis of product:

| | Calculated for $C_8H_4N_2SO_4$ | Found |
|---|---|---|
| Percent nitrogen | 12.50 | 11.86 |
| Percent sulfur | 14.28 | 13.46 |

Analysis by infra red spectroscopy: This analysis indicated an absorption band characteristic of =CH, found at 3090 cm.$^{-1}$, and an absorption band characteristic of O=C, found at 1740 cm.$^{-1}$.

Analysis by nuclear magnetic resonance: Only one absorption peak was found, indicating that hydrogens are all equivalent, and that the structure of the compound is symmetrical.

EXAMPLE 2

Preparation of N,N'-Dithiodimaleimide

A solution of 22 grams of sulfur monochloride in 150 milliliters of toluene was added, drop by drop, to a stirred suspension of 40 grams of sodium maleimide in 350 milliliters of dry toluene. The addition took about 2 hours. A mildly exothermic reaction resulted and caused the temperature to rise about 15° C. After the reaction was complete, stirring was continued for another 2 hours. The precipitate which had formed was then separated by filtration and washed with water. The water-insoluble portion was recrystallized, first from ethanol and then from tetrahydrofuran to yield 15 grams of a white solid product in the form of small needles. This product had a melting point of 213°–215° C.

Analysis of product:

| | Calculated for $C_8H_4N_2S_2O_4$ | Found |
|---|---|---|
| Percent nitrogen | 10.98 | 10.24 |
| Percent sulfur | 25.00 | 22.43 |

EXAMPLE 3

This example demonstrates the utility of the products of Examples 1 and 2 as vulcanizing agents for rubber. In this example all parts are by weight.

Four stocks, 3A to 3D, were prepared to demonstrate the use of the products in the vulcanization of a commercial styrene-butadiene copolymer rubber with a styrene content of about 20% (known as SBR–1500). For comparison, a stock 3E was prepared containing 2.0 parts of a known vulcanizing agent, N,N'-m-phenylene-bis-maleimide.

| | Stock | | | | |
|---|---|---|---|---|---|
| | 3A | 3B | 3C | 3D | 3E |
| Ingredients: | | | | | |
| SBR–1500 | 100 | 100 | 100 | 100 | 100 |
| HAF carbon black [1] | 50 | 50 | 50 | 50 | 50 |
| Naphthenic oil [2] | 7.5 | 7.5 | 7.5 | 7.5 | 7.5 |
| Product of Example 1 | 1.0 | 1.5 | | | |
| Product of Example 2 | | | 1.0 | 1.5 | |
| N,N'-m-phenylene-bis-maleimide [3] | | | | | 2.0 |

[1] High abrasion furnace black marketed under the registered trademark Philblack O by the Phillips Chemical Company.
[2] Circosol 2XH—a mixture of comparatively high molecular weight hydrocarbons having a specific gravity of 0.9465, and an aniline point of 175° F.; product of Sun Oil Company.
[3] Added as a paste containing equal weights of the bismaleimide and a naphthenic oil having a specific gravity of 0.866 and a Saybolt viscosity at 100° F. of 160–170 Saybolt seconds.

Compounding was done in the conventional manner. The rubber, carbon black, and oil were mixed in a Banbury mixer for 10 minutes. The discharge temperature was 275°–300° F. The vulcanizing agent was added to each stock on a cool two-roll mill. Portions of the stocks were cured at the temperatures and for the times indicated in the table below and were tested by methods conventionally used for rubber. The following table shows the results of tests on the cured samples.

| Stock | Temperature of cure (° F.) | Time of cure (minutes) | Tensile strength (p.s.i.) | Elongation at break (percent) | Modulus at 300% (p.s.i.) |
|---|---|---|---|---|---|
| 3A | 320 | 30 | 1,150 | 610 | 450 |
|    |     | 45 | 1,200 | 570 | 500 |
|    |     | 90 | 1,575 | 580 | 525 |
| 3B | 320 | 30 | 1,525 | 480 | 725 |
|    |     | 45 | 1,675 | 470 | 825 |
|    |     | 90 | 1,575 | 400 | 975 |
| 3C | 320 | 22 | 1,295 | 680 | 425 |
|    |     | 45 | 1,575 | 600 | 475 |
|    |     | 90 | 1,525 | 540 | 550 |
| 3D | 320 | 22 | 1,680 | 570 | 575 |
|    |     | 45 | 1,650 | 440 | 875 |
|    |     | 90 | 1,730 | 410 | 1,025 |
| 3E | 300 | 120 | 1,700 | 540 | 400 |

It is evident that both N,N′-thiodimaleimide and N,N′-dithiodimaleimide are effective vulcanizing agents for rubber.

EXAMPLE 4

This example demonstrates the effects of accelerating the cure of a rubber containing, as vulcanizing agents, the products of this invention. The accelerating agents used are either 2,2′-dibenzothiazyl disulfide or dicumyl peroxide.

| | Stock | | | | | |
|---|---|---|---|---|---|---|
| | 4A | 4B | 4C | 4D | 4E | 4F |
| Ingredients: | | | | | | |
| SBR-1500 | 100 | 100 | 100 | 100 | 100 | 100 |
| HAF carbon black [1] | 50 | 50 | 50 | 50 | 50 | 50 |
| Napthenic oil [2] | 7.5 | 7.5 | 7.5 | 7.5 | 7.5 | 7.5 |
| Product of Example 1 | 1.0 | 1.0 | | | | |
| Product of Example 2 | | | 1.1 | 1.1 | | |
| N,N′-m-phenylene-bis-maleimide [3] | | | | | 1.7 | 1.7 |
| 2,2′-dibenzothiazyl disulfide | 1.5 | | 1.5 | | 1.5 | |
| Dicumyl peroxide | | 0.7 | | 0.7 | | 0.7 |

[1] High abrasion furnace black marketed under the registered trademark Philblack 0 by the Phillips Chemical Company.
[2] Circosol 2XH—a mixture of comparatively high molecular weight hydrocarbons having a specific gravity of 0.9465, and an aniline point of 175° F.; product of the Sun Oil Company.
[3] Added as a paste containing equal weights of the bis-maleimide and a naphthenic oil having a specific gravity of 0.866 and a Saybolt viscosity at 100° F. of 160–170 Saybolt seconds.

Compounding was carried out in the same manner as described in Example 3, with the accelerating agent and the vulcanizing agent being added on a cool two roll mill. Portions of the stocks were cured at 320° F. for the times indicated in the table below and were tested by conventional methods. The following results were obtained.

| Stock | Time of cure (minutes) | Tensile strength (p.s.i.) | Elongation at break (percent) | Modulus at 300% (p.s.i.) |
|---|---|---|---|---|
| 4A | 45 | 2,100 | 480 | 1,050 |
|    | 90 | 2,000 | 430 | 1,150 |
| 4B | 45 | 1,875 | 400 | 1,210 |
|    | 90 | 1,675 | 350 | 1,310 |
| 4C | 45 | 2,175 | 600 | 700 |
|    | 90 | 2,315 | 580 | 825 |
| 4D | 45 | 2,555 | 490 | 1,125 |
|    | 90 | 2,625 | 500 | 1,125 |
| 4E | 22 | 2,405 | 460 | 1,125 |
|    | 45 | 2,505 | 460 | 1,275 |
|    | 90 | 2,560 | 450 | 1,375 |
| 4F | 22 | 2,085 | 500 | 1,025 |
|    | 45 | 2,265 | 480 | 1,075 |
|    | 90 | 2,390 | 470 | 1,200 |

It will be noted that, as compared with the data of Example 3 for the same cure times, the above results show considerably improved vulcanizate properties.

Having thus described my invention, what I claim and desire to protect by Letters Patent is:

1. A chemical having the structure

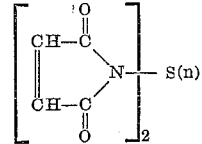

wherein $n$ is a positive integer from 1 to 2.
2. N,N′-thiodimaleimide.
3. N,N′-dithiodimaleimide.

No references cited.